United States Patent [19]

Anetsberger et al.

[11] Patent Number: 4,460,818

[45] Date of Patent: Jul. 17, 1984

[54] DRAIN SAFETY INTERLOCK FOR FRYERS

[75] Inventors: John A. Anetsberger; Richard J. Anetsberger, both of Northbrook, Ill.

[73] Assignee: Anetsberger Brothers, Inc., Northbrook, Ill.

[21] Appl. No.: 316,862

[22] Filed: Oct. 30, 1981

[51] Int. Cl.³ .................... A47J 37/12; F16K 35/00; H01H 3/16; H05B 1/00

[52] U.S. Cl. .................................. 219/200; 99/336; 99/408; 251/113

[58] Field of Search ................ 99/330, 336, 403, 408; 126/373, 374, 386, 387, 357; 210/DIG. 8; 200/61.62, 61.86; 251/95, 98, 111, 113; 431/254, 256, 257; 219/489, 493, 200

[56] References Cited

U.S. PATENT DOCUMENTS

| | | | |
|---|---|---|---|
| 1,599,894 | 9/1926 | Jach | 251/113 |
| 2,127,723 | 8/1938 | Farusek et al. | 431/256 |
| 2,146,660 | 2/1939 | Swartz | 431/256 |
| 3,210,193 | 10/1965 | Martin | 99/403 |
| 3,431,835 | 3/1969 | Angold | 99/403 |
| 3,621,165 | 11/1971 | Stone | 200/61.62 |
| 3,688,683 | 9/1972 | Boggs | 99/330 |
| 3,951,131 | 4/1976 | Houfek | 99/330 |
| 4,203,572 | 5/1980 | Coffman | 251/95 |
| 4,208,033 | 6/1980 | Kesterman | 251/113 |
| 4,210,123 | 7/1980 | Moore et al. | 99/330 |
| 4,358,647 | 11/1982 | Demi | 200/61.86 |
| 4,428,395 | 1/1984 | Bravo | 251/98 |

FOREIGN PATENT DOCUMENTS

| | | | |
|---|---|---|---|
| 567482 | 2/1945 | United Kingdom | 200/61.86 |
| 1441914 | 7/1976 | United Kingdom | 99/403 |

Primary Examiner—Roy N. Envall, Jr.
Assistant Examiner—Geoffrey S. Evans
Attorney, Agent, or Firm—McCaleb, Lucas & Brugman

[57] ABSTRACT

Safety interlock for operating handle of drain valve of deep fat fryer which blocks valve-opening movement of operating handle and is movable to unblocking position and thereby shuts off fry pot burner, subsequent valve-opening movement of handle maintaining interlock in unblocking position and interlock automatically returning to handle-blocking position upon movement of handle to valve-closing position.

5 Claims, 3 Drawing Figures

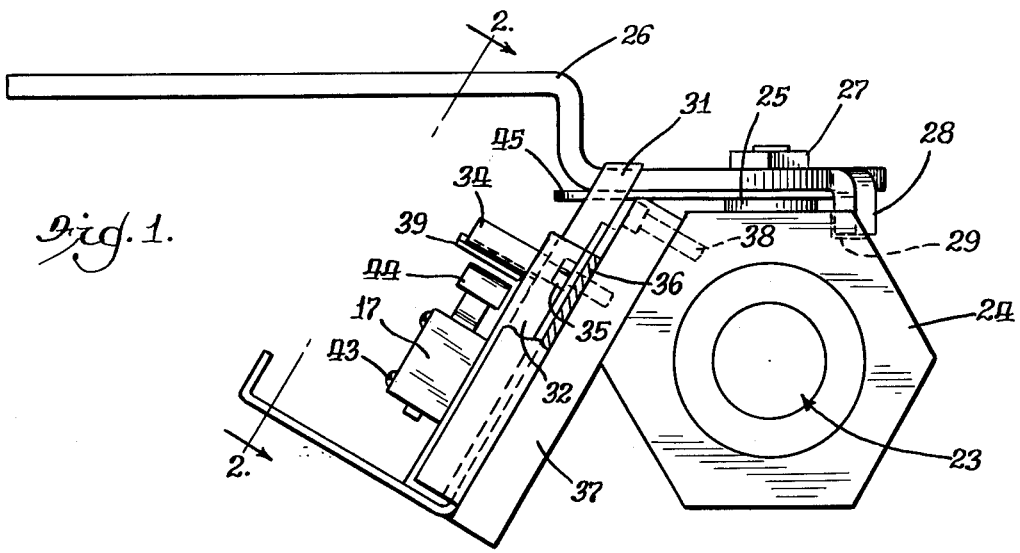
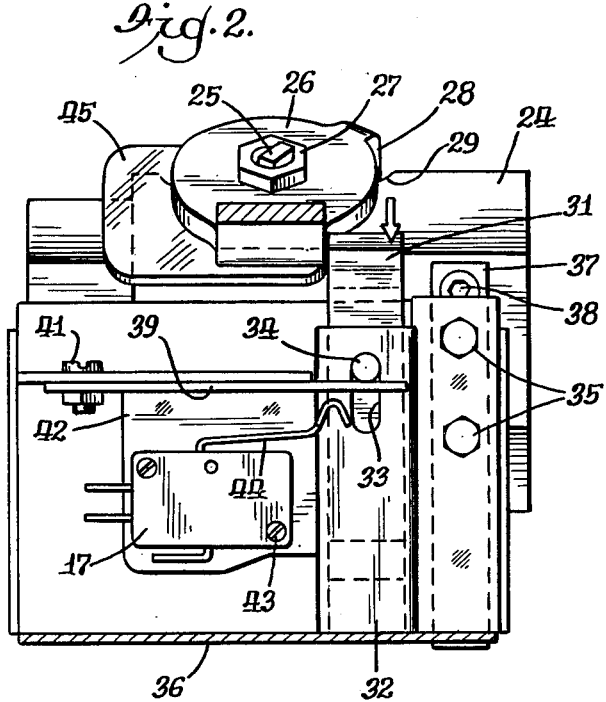
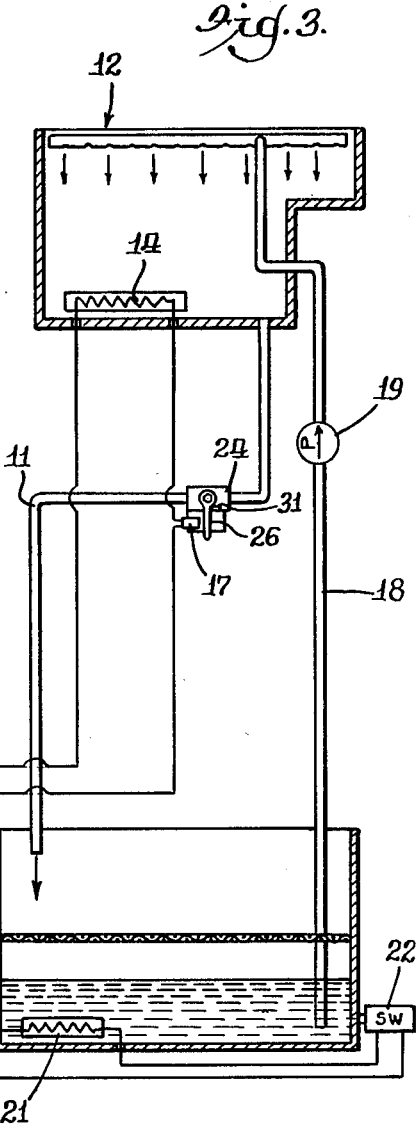

DRAIN SAFETY INTERLOCK FOR FRYERS

BACKGROUND OF THE INVENTION

1. Field of the Invention

This invention relates generally to deep fat fryers, and more particularly to a safety interlock for the operating handle of a drain valve therein.

2. Description of the Prior Art

The closest prior art known is that disclosed in U.S. Pat. No. 4,210,123 which has a drain valve (48) in the line (44) from the fry pot (14) to the filter pot (20) manually movable from normal closed position to open position by a handle (158) for draining oil from the fry pot. Such opening of the valve shuts off the burner in the fry pot by closing a normally open safety switch (152) which assures against reactivating of the burner in response to subsequent closing of the drain valve until a main switch (142) first is turned off and then again is turned on. This is done according to that patent to prevent damage to the equipment that might result should the operator open the drain valve without first turning off the main switch.

SUMMARY OF THE INVENTION

The instant invention is directed to the solution of a different problem in a similar frying apparatus, namely, preventing accidental or inadvertent discharge of hot oil that could seriously injure any person nearby. To that end, the applicant has added a safety feature to insure that the operator exercises positive control in the form of a drain valve interlock which requires conscious manual actuation by the operator to enable movement of the drain valve to open position. At the same time, actuation of the interlock shuts off the fry pot burner so that such is accomplished before the drain valve is opened. In addition, movement of the drain valve handle to open the valve, when permitted by actuation of the interlock, retains the latter in actuated position, and the interlock is automatically returned to normal handle-blocking position upon return of the handle to valve-closing position.

In the drawings:

FIG. 1 is an end view of a drain valve assembly incorporating a safety interlock which embodies the features of this invention with the casing removed and parts in section;

FIG. 2 is a sectional view taken substantially on the line 2—2 of FIG. 1; and

FIG. 3 is a wiring diagram and schematic view of a deep fat fryer embodying the invention.

DESCRIPTION OF THE PREFERRED EMBODIMENT

As shown in FIG. 3, the drain valve safety interlock of this invention is incorporated in a drain conduit 11 interconnecting a deep fat fryer 12 and a filter unit 13 of suitable construction, an electric burner 14 for heating the cooking oil being provided in the fryer 12 which is connected to a power source 15 through a main switch 16, a suitable relay and a normally closed microswitch 17 of the safety interlock. A return conduit 18 also is provided which incorporates a pump 19 for returning the filtered oil from the unit 13 to the fry pot 12; and to prevent congealing of the cooking oil in the filter unit 13 before it is removed therefrom, as by the pump 19, an optional heater element 21 may be provided in the filter unit under the control of a switch 22.

As shown in FIGS. 1 and 2, the usual drain valve for controlling flow of cooking oil from the fryer 12 to the filter 13 is indicated by reference numeral 23 and is mounted in well known manner in a valve casing 24 interposed in the conduit 11 with a valve operating shaft 25 extending therethrough. The outer end of the shaft 25 is reduced, provided with opposed flat surfaces to receive, or extend through similarly shaped openings in, an operating handle 26, and threaded to also receive a nut 27 for retaining the handle thereon. The handle 26 has a depending lug 28 extending into a suitable recess 29 in the outer surface of the valve casing 24 to limit opening and closing movements of the valve 23 by the handle.

The drain valve safety interlock of this invention comprises a member or plunger 31 normally disposed with its outer or upper end in the path of movement of the handle 26 from its valve-closing position of the drawings in a counterclockwise direction, as seen in FIG. 2, to open the valve 23. To this end, the member 31 is slidably encased in, and extends outwardly from, a housing 32 having an elongated opening 33 for a pin 34 secured to the member 31. The housing 32 is attached by screws 35, along with a mounting plate 36, to a support 37 in turn secured, as by screws 38, to the valve casing 24. The member 31 normally is held in its outer handle-blocking position of the drawings by the free end of a leaf spring 39 urging the pin 34 against the outer end of the slot 33, the other end of the spring being secured, as by a nut and bolt 41, to the outwardly extending shelf of a mounting bracket 42 riveted or otherwise attached to the mounting plate 36.

The previously noted normally closed microswitch 17 also is mounted, as by screws 43, on the bracket 42 with its switch opening member 44 disposed adjacent the free end of the spring 39 for actuation thereby as the member 31 and its pin 34 are manually moved inwardly or downwardly in the direction of the block arrow in FIG. 2 by an operator. Thus, selective depression or conscious operation of the member 31 to permit valve-opening movement of the handle 26 first opens the normally closed switch 17 to deenergize or shut off the fry pot burner 14, and subsequent opening of the drain valve 23 will not result in inadvertent discharge of hot oil that could seriously injure any person nearby. This is particularly important because the filter unit 13 is mounted for ready removal from the deep fat fryer for use with other fryers, and during its temporary absence opening of the drain valve 23 would result in free and unimpeded discharge of the hot oil from the fry pot 12.

Means are provided to retain the member 31 in actuated or depressed position when the handle 26 is moved toward valve-opening position, as permitted by such actuation of the interlock, which in the illustrated preferred embodiment comprises a plate 45 mounted on the valve shaft 25 below, and for movement with, the handle 26. In its normal position with the handle in valve-closing position, the plate 45 is disposed as illustrated in FIGS. 1 and 2, and when the handle 26 is moved counterclockwise as seen in FIG. 2 toward and into valve-opening position, the plate 45 is disposed in the path of and prevents return to normal handle-blocking position of the member 31. Upon subsequent return of the handle 26 to valve-closing position, the interlock member 31 is automatically returned to normal handle-blocking position by the spring 39.

It is thought that the invention and many of its attendant advantages will be understood from the foregoing description, and it will be apparent that various changes may be made in the form, construction, and arrangement of the parts without departing from the spirit of the invention or sacrificing all of its material advantages, the form hereinbefore described and shown in the drawings being merely a preferred embodiment thereof.

The embodiments of the invention in which an exclusive property or privilege is claimed are defined as follows:

1. In a deep fat fryer having a fry pot for cooking oil with a burner for heating the oil, a filter unit, and a conduit for conducting oil from said fry pot to said filter unit including a drain valve with a handle for opening and closing the same; a drain valve safety interlock for preventing inadvertent discharge of hot oil from said conduit, comprising a member normally blocking operation of said handle to open said drain valve and selectively manually movable to actuated position to permit valve-opening movement of said handle and to shut off said burner before opening of said valve.

2. In a deep fat fryer according to claim 1, means operable by said handle, as the latter moves to open said drain valve, to maintain said member in actuated position.

3. In a deep fat fryer according to claim 2, means automatically operable upon return of said handle to valve-closing position to move said member to normal handle-blocking position.

4. A deep fat fryer safety interlock according to claim 2, wherein said member comprises a plunger, and said means comprises a normally inoperative plate operable upon valve-operating movement of said handle to block return movement of said member to handle-blocking position.

5. In a deep fat fryer safety interlock according to claim 4, spring means operable in response to return of said handle to valve-closing position to move said member to handle-blocking position.

* * * * *